Figure 1:
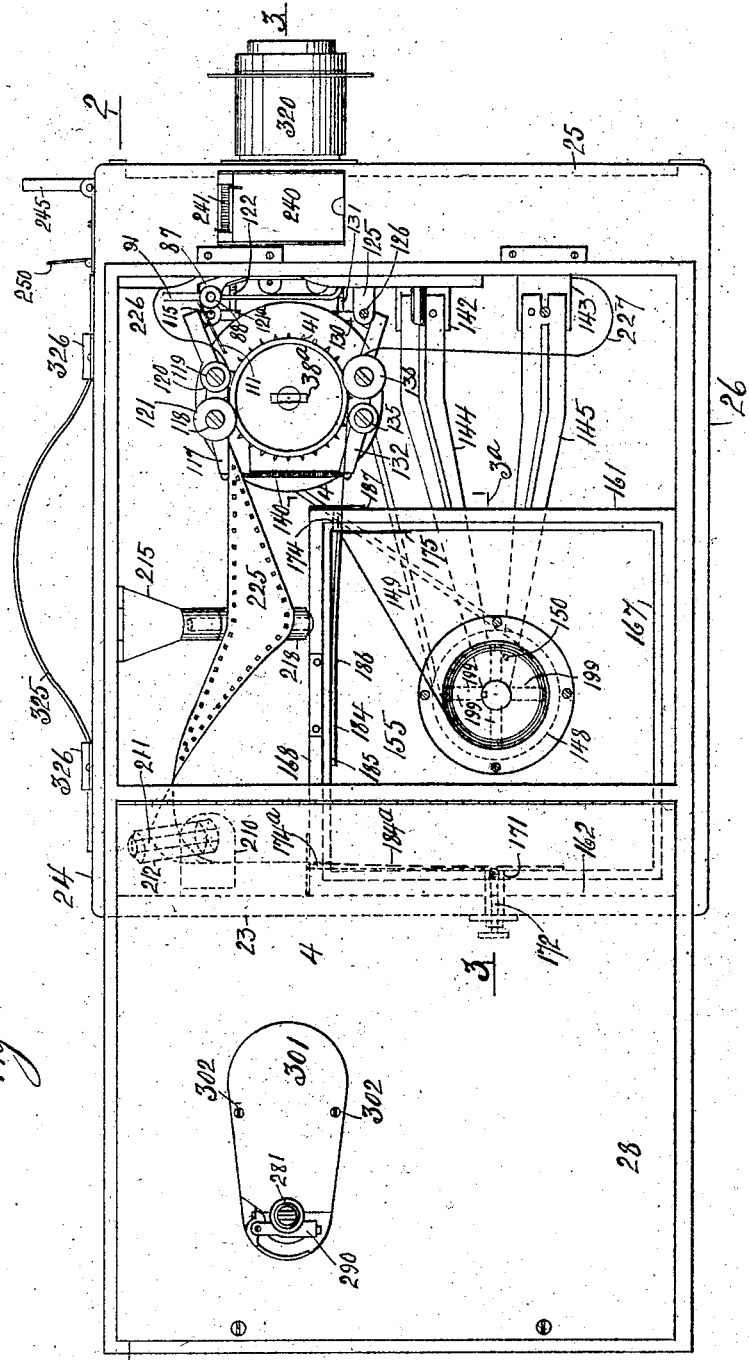

E. SCHNEIDER.
CAMERA.
APPLICATION FILED NOV. 26, 1913.

1,202,231.

Patented Oct. 24, 1916.
3 SHEETS—SHEET 1.

Witnesses:
John J Hewitt
Edward A. Conroy

Inventor
Eberhard Schneider
By his Attorney
Arde Bonneville

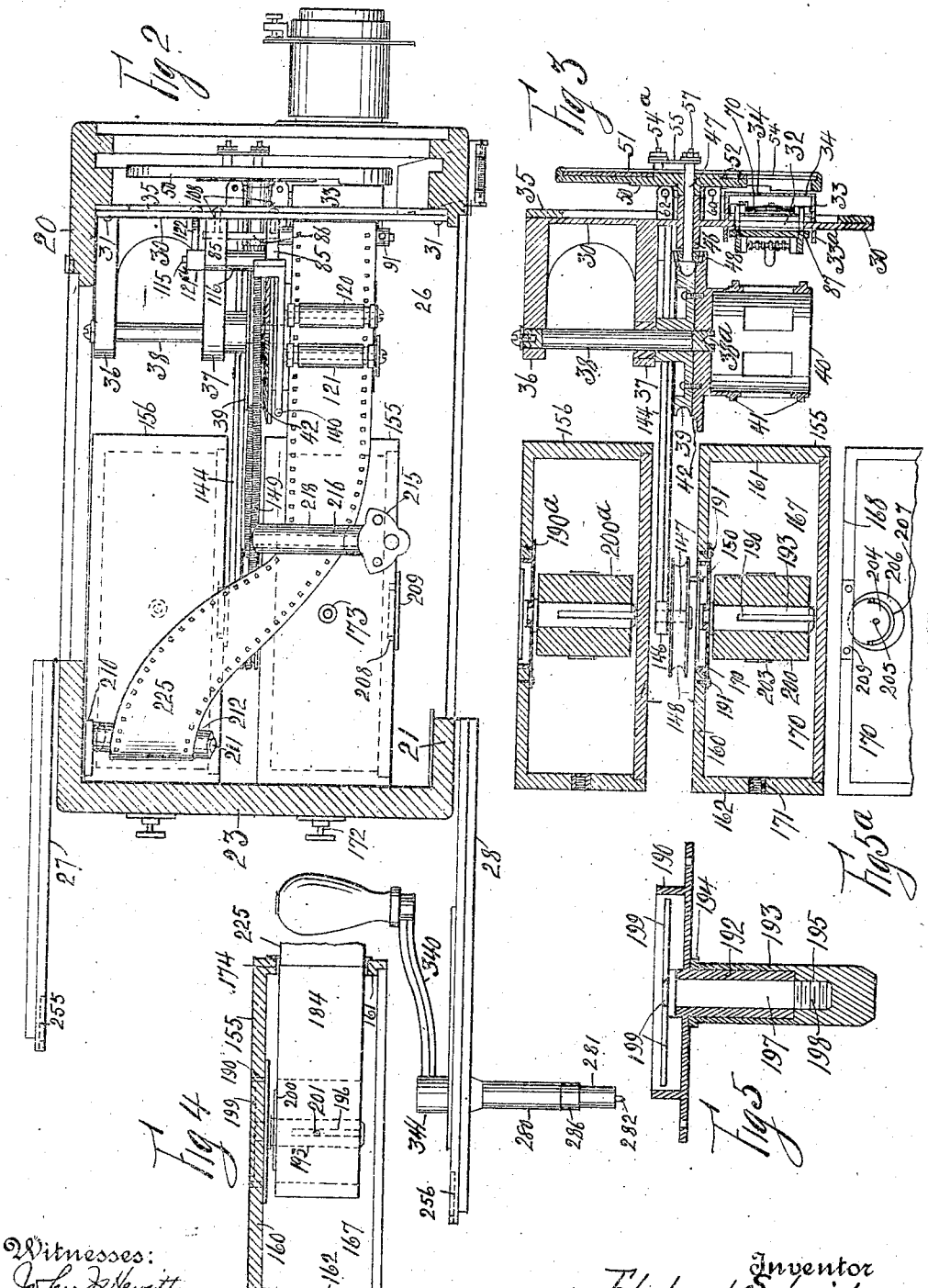

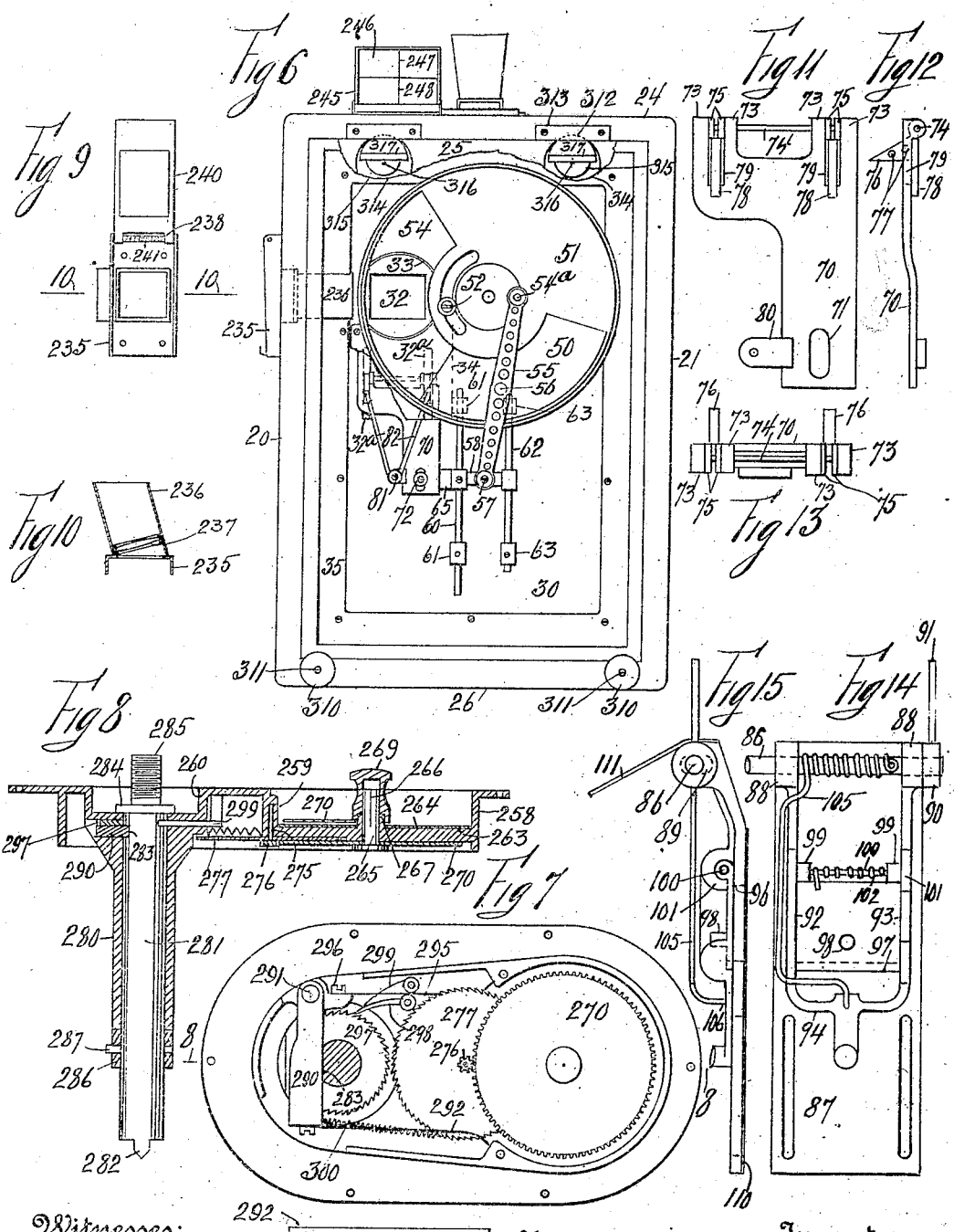

UNITED STATES PATENT OFFICE.

EBERHARD SCHNEIDER, OF NEW YORK, N. Y.

CAMERA.

1,202,231.

Specification of Letters Patent.

Patented Oct. 24, 1916.

Application filed November 26, 1913. Serial No. 803,163.

*To all whom it may concern:*

Be it known that I, EBERHARD SCHNEIDER, a citizen of the United States, and a resident of the borough of Manhattan, in the county of New York and State of New York, have invented certain new and useful Improvements in Cameras, of which the following is a specification.

This invention has among its objects the production of a camera that has contained within its casing the retorts for the film thereof. The said film can be driven by means connected to a door hinged to the casing of the camera. The driving means of the sprocket drum contain a pair of bevel wheels and said wheels actuate driving teeth that engage the film of the camera. All the parts of the camera are of the simplest construction to avoid complicated parts.

Figure 1 represents a side view of the camera with a side door thereof in an open position and a film retort open, Fig. 2 shows a partial top plan view and partial section of Fig. 1 on the line 2, 2, Fig. 3 is a partial section of Fig. 1 on the broken line 3, 3ᵃ, 3, Fig. 4 shows a partial section of Fig. 1 on the line 4, 4, Fig. 5 shows a partial section as on the line 3, 3ᵃ of Fig. 1, Fig. 5ᵃ shows a partial front view of a detail, Fig. 6 represents a right hand side view of Fig. 1 with the front cover removed, Fig. 7 represents an enlarged detail of Fig. 1, Fig. 8 shows a partial section of Fig. 7 on the line 8, 8, Fig. 9 shows an elevation of a detail, Fig. 10 is a section of Fig. 9 on the line 10, 10, Fig. 11 is an elevation of a detail, Fig. 12 is a left hand view of Fig. 11, Fig. 13 is a top view of Fig. 11, Fig. 14 represents an elevation of a detail, Fig. 15 is a left hand side view of Fig. 14 and Fig. 16 shows a plan view of a detail.

The camera is shown with a casing or inclosure comprising the side walls 20, 21, the back wall 23, the roof 24, the removable front 25, the bottom wall 26 and the doors 27 and 28 hinged over openings in the walls 20 and 21. A metallic front frame plate 30 located within the casing is held in place by the screws 31. An aperture 32 and slots 32ᵃ are formed in the plate 30. An annular flange 33 extends from the plate 30 and encircles the aperture 32. A projecting cover 34 extends from and below the flange 33. A pair of guide flanges 33ᵃ extend from the plate 30.

A frame 35 is fastened to the plate 30. With the plate 30 are formed journal bearings 36, 37 for the driving spindle 38 having the key opening 38ᵃ. The said spindle has fastened thereto the grooved driving pulley 39 and the latter has fastened thereto the film sprocket drum 40 having the sprocket pins 41. With the drum 40 is formed a flange constituting a bevel wheel with the teeth 42 at the periphery thereof.

The plate 30 has formed therewith a journal bearing 46, in which is journaled a spindle 47 to one end of which latter is fastened a bevel pinion 48 that meshes with the bevel teeth 42. On the spindle 47 is fastened one member 50 of the shutter to which is adjustably fastened a second member 51 by means of a screw 52. An opening 54 is formed in the member 50. From the member 50 extends a pin 54ᵃ which carries one end of a connecting rod 55 having the openings 56 to reduce the weight thereof. The other end of the said connecting rod is pinned by means of a pin 57 to a crosshead 58. A rod 60 preferably hollow carried by the cross head, is guided in the guide brackets 61 extending from the plate 30. The said cross head also slides on a guide rod 62 that is secured in brackets 63 extending from said plate 30. The cross head 58 has extending therefrom an arm 65 to which is fastened an adjustable actuating bracket 70. The bracket has an elongated opening 71 through which a screw 72 passes into a threaded opening in said arm 65. The said bracket has formed at its upper end pairs of journal bearings 73 for a pin 74. Between each pair of the journal bearings 73 is hinged the forked eye 75 of a driving tooth 76 having openings 77 for lightness and the leg 78. Slots 79 are formed in the bracket 70 for the teeth 76.

A lug 80 extends from the bracket 70 and has pinned thereto by means of the screw 81, a spring with the two arms 82 that bear on the legs 78. Journal brackets 85 extend from the plate 30 and which have hinged thereto the hinge pin 86 of the guide plate 87.

The guide plate 87 has formed at its upper end a pair of ears 88 having each a slotted opening 89 for the hinge pin 86 thereof. At one end of the pin 86 is fastened the collar 90 having the arm 91 extending therefrom. A pair of flanges 92, 93 with the connecting member 94 extend up from the guide plate 87. Over an opening 96 in the plate 87 is hinged a door 97 having the handle 98. A pair of ears 99 on said door engage a hinge pin 100 that is supported in the flange 92 and the ear 101 of the flange 93. A spring 102 on the pin 100 bears on the door 97.

The hinge pin 86 has fastened thereto one end of the spring 105, the other end 106 of which bears on the guide plate 87. A pair of screws 108, are in threaded engagement with the plate 30 and brackets 85. Their ends pinch the hinge pin 86. By their use the tension of the spring 105 is adjusted by means of the arm 91, and the guide plate 87 is maintained in proper position against the film to be described. A layer 110 of soft material is fastened to the smooth face of the guide plate 87 and a film protecting hood 111 extends from the top end thereof.

A pin 115 is journaled in the brackets 85 and has fastened thereto a barrel 116 from which extends a roller arm 117. The latter carries pivots 118, 119, on which are journaled the adjusting rollers 120, 121. The latter bear on the film to be described to maintain it in proper contact with the drum 40. An arm 121$^a$ extends from the pin 115 and the lower end of the arm abuts against the screw 122 that is in threaded engagement with the plate 30. Brackets 125 similar to 85 extend from the plate 30. The latter brackets have pivoted therein a pin 126 on which is carried a barrel similar to 110 and which has extending therefrom a leg 130 that bears against a screw 131 extending from the plate 30. A roller arm 132 extending from the latter barrel has journaled thereto the adjusting rollers 135, 136. A spring 140 connects the swinging ends of the arms 117 and 132. Lugs 142, 143 extend from the plate 30 and have clamped thereto a hanger with the legs 144, 145. At the outer end of the legs 144, 145 is formed boss 146 for a pivot 147 that carries the grooved pulley 148. A spring cross belt 149 connects the pulleys 39 and 148. A driving pin 150 extends from the pulley 148.

Within the casing are located a film receiving retort 155 and a film discharging retort 156. The retort 155 comprises the main side wall 160, the front wall 161, the rear wall 162, the bottom 167, the roof 168 and the detachable door 170. The rear wall 162 has fitted therein a screw fitting 171 for a screw 172 which passes through an opening in the rear wall 23 of the casing of the camera. A similar screw fitting 173 is fitted to the roof 168. In the front wall 161 of the retort 155 is formed a slot 174 to enable the film used to pass therethrough. A piece of pliable material 175 is fastened to the wall 161 and to the lower surface of the slot 174. A plate spring valve 184 has one end 185 secured to the roof 168 of the retort 155 and the free end thereof extends into the opening 174 and bears on the film. A cover 186 of pliable material like velvet is fastened to the spring valve 184 to bear on the film. A plate 187 with an opening registering with the slot 174, is secured to the wall 161 of the retort 155. In the side wall 160 is formed an opening for the annular box frame 190, which latter is fastened to said wall by means of screws 191. The said frame has extending therefrom the barrel 192 and upon the latter is located a sleeve 193 having the collar 194 at one end, threads 195 at the other end and the groove 196 on its outer surface. A wheel having the shaft 197 threaded at 198, and having the four spokes 199, is shown with its shaft in the barrel 192, and its threaded portion 198 in threaded engagement with the threads 195 of the barrel 193. A barrel 200 is located upon the sleeve 193, and has a locking pin 201 that engages the groove 196 of the sleeve 193. A clamping spring 203 is connected to the barrel 200, to engage the film to be described.

The detachable door 170 of the retort 155, has connected thereto a disk 204 which is eccentrically pivoted on a pin 205 extending from a circular depression 206 formed in said door. A band 207 is hinged to opposite sides of the disk. The roof 168 of the retort is notched as indicated at 208 and has secured thereto the plate 209. The disk when turned as shown in Fig. 5$^a$ locks the cover 170 to the retort, and when the door is to be detached the disk 204 is turned by means of the band 207 to detach it from the notch 208.

The retort 156 is a duplicate of the retort 155 and it is located so that its opening 174$^a$ similar to 174 is located in its roof instead of the front wall thereof. A plate spring valve 184$^a$ is shown similar to 184. An annular box frame 190$^a$ similar to 190 is connected to the retort 156, and a barrel 200$^a$ similar to 200 is provided.

From the side walls 20 of the casing of the camera extends a bracket 210 for the journal pin 211 the axis of which is inclined to the wall 20. A guide roller 212 is journaled on said pin 211. From the roof 24 of the casing extends a bracket 215 with the journal pin 216 inclined to said roof for the guide roller 218.

A picture film 225 is shown leaving the retort 156, guided over the guide roller 212 and under the guide roller 218. The film then passes over the sprocket drum 40, forming a top loop at 226 and then passes down between the guide plate 87 and the wall 30, passing the opening 32 in the latter. The film then forms the bottom loop 227 and returns to the sprocket drum 40 being held in position thereto by means of the rollers 120 and 121 of the arm 117 and the rollers 135, 136 of the arm 132. The film enters the magazine 155 through the opening 174 under the spring valve 184 which slightly bears on the said film.

In the front portion of the side wall 21 of the casing for the camera is secured a lens frame 235 and which has formed therewith an inclined barrel 236 for the lens 237. A hinge pin 238 is supported in the frame 235 which carries a door 240. A helical spring 241 has an end fastened to the pin 238 on which it is supported and the other end of the spring bears on the door to keep the latter normally closed.

To the roof 24 of the casing is pivoted a view finder 245 with the lens 246, having the cross lines 247 and 248. A pointer 250 for the view finder is pivoted to the roof 24 of the casing. The side doors 27 and 28 can be locked in position by disks 255, 256 similar to 204.

To the side door 28 is fastened a box frame 258 with the circular cavity having the wall 259 and the circular cavity having the wall 260. On the face 263 of the cavity with the wall 259 is located a dial 264 with a scale not shown. A pivot 265 with a slot 266 is held in a hub 267 of the said frame. A hub 269 is engaged by the pivot 265 and has extending therefrom a pointer 270 for said scale. The pivot 265 carries a large gear 270. A pin 275 is journaled in the frame 258 and has fastened thereto the pinion 276 which meshes with the gear 270. The pin 275 also carries the ratchet wheel 277.

The frame 258 has extending therefrom the sleeve 280, in which is supported the driving shaft 281 having the key projection 282 that can engage the key opening 38ᵃ of the shaft 38, when the door 28 is in a closed position. In the surface of the shaft is formed a slot 283. The shaft 281 has a collar 284 with the threaded portion 285 at one end thereof. A collar 286 is pinned to the shaft 281 by means of the pin 287. An arm 290 is pivoted to the frame 258 by means of a pin 291. To the lower end of the arm 290 is fastened a pawl 292 having a slot 293 with the edge 294, and the latter can engage the teeth of the ratchet wheel 277. A spring pawl 295 has one end fastened to the frame 258 by means of a screw 296 and the free end thereof engages the ratchet wheel 277.

On the shaft 28 is fastened a ratchet wheel 297 and to the frame 258 is pivoted a pawl 298 the free end of which engages with said ratchet wheel 297. A spring 299 bears upon said pawl 298, and a spring 300 has one end fastened to the lower end of the arm 290 and the other end to the wall 259. A cover 301 is fastened to the box frame 258 by means of screws 302. At the front ends of the side walls 20 and 21 are secured small disk shaped buttons 310 by means of the screws 311 and at the front ends of the roof 24 are formed notches 312 that are covered by the plates 313. In the front 25 are formed circular depressions 314 for the disks 315 that are eccentrically pivoted on the pivots 316. To each disk 315 is pivoted a band 317 by means of which the disks can be locked in the depressions 312. To the front 25 is secured the lens casing 320 with the usual lens. A strap 325 is connected to the roof 24 by means of strap holders 326.

A detachable operating handle 340 with a boss 341 is in threaded engagement with the threaded portion 285 of the driving shaft 281.

To operate the invention the film 225 is located in the camera as already described and the doors 27 and 28 are closed. With the door 28 in a closed position, the key projection 282 is made to enter the key opening 38ᵃ of the shaft 38. The picture to be taken is then brought in proper position on the lens of the lens casing 320, by means of the view finder 245. The operator then turns the handle 340, by which the sprocket drum 40 is turned to propel the film 225. The pulley 39 turns with the sprocket drum 40 and by means of the belt 149 rotation is given to the pulley 148 and consequently to the barrel 200. By this means the film is drawn from the film discharging retort 156 and made to enter the film receiving retort 155. Upon the film leaving the retort 156 it passes over the guide roller 212, under the guide roller 218. The film then engages the sprocket drum 40 and is adjusted by the adjusting rollers 120 and 121. The film next passes between the guide plate 87 and the wall 30, passing the opening 32. The film then returns to the sprocket drum 40 being held in position thereto by the rollers 135 and 136, and then enters the retort 155. With the rotation of the drum 40 the bevel pinion 48 is made to turn and which turns the spindle 47. The shutter having the member 50 turns with the spindle 47 and light is permitted to impinge on the film through the opening 32 at the proper times. With the rotations of the shutter 50 the pin 54 is made to travel in its orbit and through the connecting rod 55, the crosshead 58 is reciprocated. With the reciprocations of the crosshead 58, the actuating bracket 70 is reciprocated. By means of the bracket 70 the film is moved the proper amounts and at the proper times past the opening 32. The driving teeth 76 of the bracket 70 disengage from the perforations of the film 225 upon the up strokes of said bracket, but upon the down strokes of said bracket engage said perforations to pull down the film. The number of revolutions made by the crank handle 340 is indicated upon the dial 264 by means of the pointer 270. By means of the lens 237 the picture on the film can be observed.

Having described my invention what I desire to secure by Letters Patent and claim is:

1. In a camera the combination of a casing, a driving spindle journaled in the casing, a bevel wheel connected with the spindle, a sprocket drum extending from the bevel wheel, a spindle journaled in the camera, a bevel pinion on the spindle meshing with the said bevel wheel, a shutter connected to said spindle, a connecting rod with one end pinned to the shutter, a cross head for the other end of the connecting rod, an actuating bracket connected to the cross head and means on the bracket to engage a film.

2. In a camera the combination of a film retort, a barrel extending into the retort, a sleeve having threads at one end of its inner surface supported on the barrel, a shaft within the barrel having a threaded end engaging the threads of the sleeve, means to turn the shaft, and a barrel for the film supported on and detachably locked with said sleeve.

3. In a camera the combination of a film retort, a barrel extending into the retort, a sleeve having threads at one end of its inner surface supported on the barrel, a shaft within the barrel having a threaded end engaging the threads of the sleeve, spokes extending from the shaft, means to engage the spokes and turn the shaft, and a barrel for the film supported on and detachably locked with said sleeve.

4. In a camera, the combination of a film retort, a box frame secured to one of the walls of the retort, a barrel on the frame extending into the retort, a sleeve having threads at one end of its inner surface supported on the barrel, a shaft within the barrel having a threaded end engaging the threads of the sleeve, spokes extending from the shaft, means to engage the spokes and turn the shaft, and a barrel for a film supported on and detachably locked with said sleeve.

5. In a camera the combination of a casing, a frame plate in the casing at the front end thereof, a driving spindle journaled in the casing, a bevel wheel connected with the spindle, a sprocket drum extending from the bevel wheel, a spindle journaled in the frame plate, a bevel pinion on the spindle meshing with said bevel wheel, a shutter connected to said spindle, a connecting rod with one end pinned to the shutter, a cross head for the other end of the connecting rod, an actuating bracket connected to the cross head, driving teeth pivoted to said bracket with their points extending through slots in the frame plate and engaging a film that is also engaged by said sprocket drum.

6. In a camera the combination of a casing, a frame plate in the casing at the front end thereof, a spindle journaled in the frame plate, a shutter fastened to the spindle, a pair of guide brackets extending from the frame plate, a reciprocating rod guided by said brackets, a second pair of brackets extending from the frame plate, a guide rod secured to the second pair of brackets, a crosshead with one end fastened to the reciprocating rod and the other end sliding on the guide rod, a connecting rod with one end pinned to the shutter and the other end pinned to the said crosshead, an actuating bracket connected to the crosshead and driving teeth pivoted to the actuating bracket engaging a film in the camera.

Signed in the borough of Manhattan, in the county of New York and State of New York, this 25th day of November, A. D. 1913.

EBERHARD SCHNEIDER.

Witnesses:
A. A. DE BONNEVILLE,
PAUL TAUSIG.